Dec. 18, 1956  J. B. HARRISON ET AL  2,774,805
BATTERY STRUCTURE
Filed Oct. 22, 1952
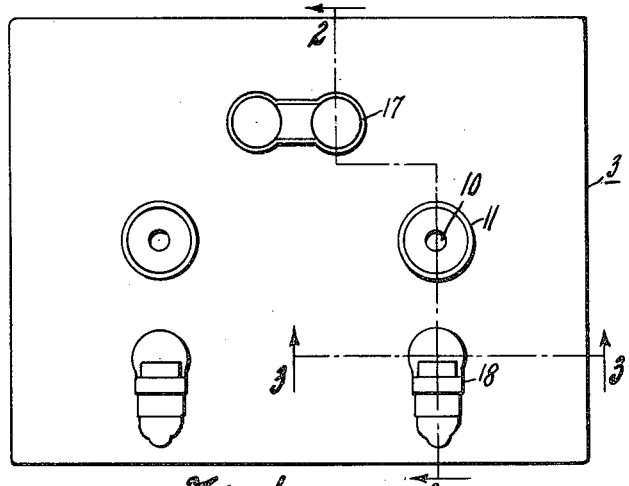
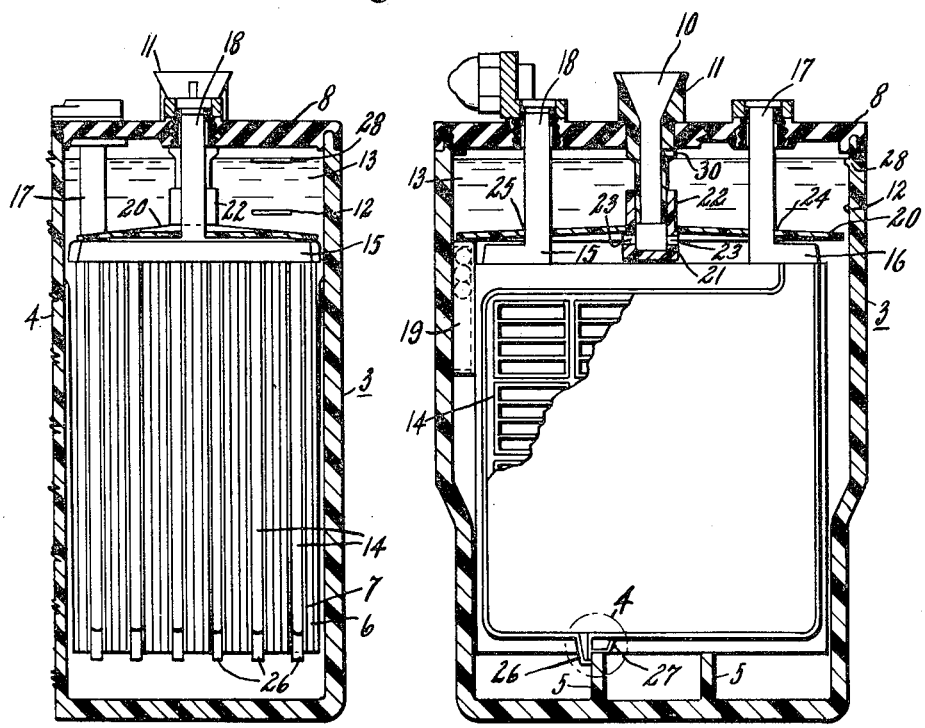
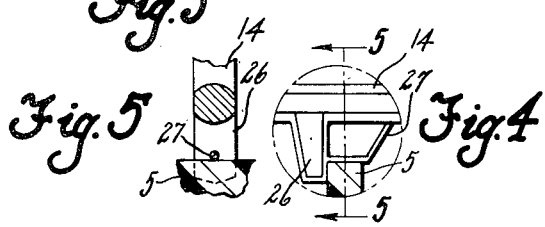
INVENTORS
JOHN B. HARRISON
GARTH A. ROWLS
BY
THEIR ATTORNEYS

United States Patent Office 2,774,805
Patented Dec. 18, 1956

2,774,805
BATTERY STRUCTURE

John B. Harrison and Garth A. Rowls, Muncie, Ind., assignors to General Motors Corporation, Detroit, Mich., a corporation of Delaware Application October 22, 1952, Serial No. 316,191

6 Claims. (Cl. 136—79)

This invention relates to storage batteries of the heavy duty type and more particularly to the Faure type of storage battery which is subject to repeated and continuous overcharging.

One of the objects of the present invention is to lessen the possibility of damage to the battery during shipment and initial installation and during the periods when the battery may be subject to long continuous overcharging.

Another object of the present invention is to incorporate into a heavy duty Faure type storage battery, means whereby gases formed in the electrolyte during charging will be directed and continuously carried from the interior of the battery thereby reducing the possibility of gas explosions within the battery.

Another object of our invention is to provide a destructible or deformable support which will position and support the plates during shipment and initial installation and will be destroyed or deformed by the growth of the positive plates during periods of overcharging.

Further objects and advantages of the present invention will be apparent from the following description reference being had to the accompanying drawings wherein preferred embodiments of the present invention are clearly shown.

In the drawings:

Fig. 1 is a plan view of a storage battery embodying the present invention.

Fig. 2 is a side elevation of the storage battery in section along the lines 2—2 of Fig. 1. This view shows the storage battery embodying the invention of the support means on the plates and the gas vent collecting and direction means.

Fig. 3 is an end elevation in section on line 3—3 of Fig. 1.

Fig. 4 is an enlarged view of the support wire structure of the plate.

Fig. 5 is a sectional view of the support wire as shown in Fig. 4.

A battery container 3 may contain a single cell or a plurality of cells as shown in Fig. 1. The container which may be constructed of some suitable material may have integral partitions 4 dividing the battery into individual cells, each having ribs 5 at the bottom upon which rest a plurality of negative plates 6 and separators 7. The container is provided with a cover 8, which may be made from suitable material such as hard rubber, having apertures therein to accommodate an explosion proof vent plug and the battery terminal posts 17 and 18. The explosion proof vent plug has a filling and vent passage 10 passing therethrough and has its lower end extending beneath the surface of the electrolyte 13. The numerals 12 and 28 indicate the lower and upper desired levels of the electrolyte. Each cell unit assembly also includes a set of positive grid type plates 14 alternating with the previously mentioned negative plates 6 and separated therefrom by the separators 7. Each set of plates 6 and 14 are joined to lugs 15 and 16 respectively having integral terminal posts as shown in Figs. 2 and 3, which are sealed in the cell cover.

The battery may also be furnished with a sight hydrometer 19 having a plurality of balls therein to indicate the specific gravity of the electrolyte. In this embodiment the battery case may be wholly or partially transparent. One method of attaching this hydrometer to the battery case is to form a molded channel of a plastic type material and cement this channel in suitable ribs formed in the battery case. In this manner the position of the balls is visible through the case.

The battery assembly also includes a gas collecting hood means whereby the gases formed in the battery cell are continuously collected and vented out of the filler and vent passage when the battery is being charged. This is accomplished by providing a collecting hood means 20 comprising a cup-shaped hood positioned in the battery cell above the plates and below the electrolyte level. The hood may be held in position by an annular collar 21 on a thimble-shaped sleeve 22 which is cemented or otherwise attached to the filler and vent funnel 11. The sleeve 22 has small circumferentially spaced holes 23 located in the thimble beneath the annular collar 21 so that the top of the holes correspond with the lower surface of the collecting hood 20. The hood has snug fitting apertures 24 and 25 to permit the terminal posts to pass therethrough. The periphery of the gas collecting hood extends past the line of vertical projection of the plates. This permits the vertically rising gas bubbles to be impeded by the lower surface of the hood and to be directed along the cup-shaped hood to the holes in the thimble at the lower end of filler and vent tube. The gas will thus be passed out of the cell as formed and prevent concentration thereof and thus eliminate the danger of explosions during the period of gassing. Any gases which may pass the periphery of the hood 20 will be vented through passage 30 in the vent plug 11 and would tend to collect in the top of the battery.

This invention is further directed to a storage battery which will withstand severe and continued overcharging. A battery of this type is widely used in telephone installations. It has been found that the positive plates under continued overcharging conditions exhibit an unusual growth. A solution to the problem of providing for the growth of the postive plates is to suspend the plate grids from the terminal lugs. This arrangement causes difficulty in the shipment of the battery as plates often become detached from the lugs due to vibration in their otherwise unsupported state. A solution to this problem embodies the use of distortable and/or destructible supports for the plates which are useful during the period when the battery is being transported. This is accomplished with lugs 26 which are formed on the grid of the positive plate 14. These lugs are of a suitable length and location as to come in contact with a vertical surface of the support ribs 5. This arrangement will prevent the transverse movement of the plate. A support means such as an angularly formed thin wire member 27 having one end attached to the lug 26 and the other to the plate 14 will support the plate on the wire support which rests on the horizontal surface of the rib 5, as seen in Fig. 2. The support wire being of small diameter will be very susceptible to destruction or distortion after the battery is in use. In this manner, the positive plates will be permitted to grow without distortion of the plate per se through distortion or destruction of the support. The specific structure of this support wire is clearly disclosed in concurrently filed application Ser. No. 316,192 covering a battery grid as filed by John B. Harrison and Garth A. Rowls on October 22, 1952, and assigned to the assignee of the present invention.

While the form of embodiments of the present invention as herein disclosed constitutes a preferred form, it is to be understood that other forms might be adopted, all coming within the scope of the claims which follow.

What is claimed is as follows:

1. A heavy duty type storage battery adapted to withstand continued overcharging comprising in combination; a container adapted to receive a cover having a plurality of openings therein; a plurality of plates within the container, said plates consisting of positive plates, and negative plates; separators between the plates; positive and negative terminal posts attached to the respective plates and extending through apertures in said cover; a support rib within the container adapted to have certain of said plates and separators rest therein; wire-like members forming the frame of the positive plates; a lug integral with the wire-like members of the positive plate adapted to contact the support rib and thereby position the positive plate; and a wire-like support means for the positive plate connected to the lug and the frame wire, said support means being of relative less cross sectional area than the frame wire of the positive plate so as to be permanently deformed upon the distortion of the positive plate due to overcharging whereby said means only functions as a support during initial use of said battery.

2. In a storage battery grid, the combination comprising; a frame defining a border for a grid network, a lug integral with said frame for vertically supporting said frame in a storage battery case, a second lug integral with said frame for maintaining said frame against horizontal displacement in said case, and a wire element integral with said frame and second lug of substantially less thickness than said frame disposed external to the border of said frame for supporting said grid during initial use of the battery.

3. In a storage battery grid, the combination comprising; a frame, a lug integral with said frame arranged to permanently support said frame vertically in a case for said battery, a second lug on a bottom edge of said frame for horizontally positioning said frame in the case of said battery, and a wire element of substantially less cross-sectional area than said frame integral with and extending between the frame and the second lug to additionally vertically support said frame only during initial use of said battery.

4. In a storage battery grid, the combination comprising; a frame, a grid network within said frame, a lug integral with and extending from a top edge of said frame for vertically supporting said grid in a case for said battery, and a wire element integral with and extending from a bottom edge of said frame having a substantially less cross-sectional area than the frame to additionally vertically support said frame only during initial use of said battery.

5. In a storage battery grid, the combination comprising; a frame, a grid network within said frame, a lug integral with said frame for vertically supporting said grid in a case for said battery, and a wire element integral with and extending from a bottom edge of said frame having a substantially less cross-sectional area than the frame to additionally vertically support said frame only during initial use of said battery.

6. In a storage battery grid, the combination comprising; a frame, a grid network within said frame, a lug integral with and extending from a top edge of said frame for permanently vertically supporting said frame in a core for said battery, a second lug integral with a bottom edge of said frame and extending to horizontally position said frame in the case for said battery, and a wire element integral with and extending from a bottom edge of said frame and connected to said bottom lug having a substantially less cross-sectional area than the frame and grid network to additionally vertically support during initial use of the battery.

References Cited in the file of this patent

UNITED STATES PATENTS

| 415,981 | Smith | Nov. 26, 1889 |
| 429,897 | Felt | June 10, 1890 |
| 709,157 | Kennedy | Sept. 16, 1902 |
| 827,968 | Gardiner | Aug. 7, 1906 |
| 918,832 | Ekstromer | Apr. 20, 1909 |
| 1,283,670 | Christiansen | Nov. 5, 1918 |
| 1,327,234 | Handler | Jan. 6, 1920 |
| 1,488,738 | Cook et al. | Apr. 1, 1924 |
| 1,543,017 | Lea | June 23, 1925 |
| 2,027,310 | Smith | Jan. 7, 1936 |
| 2,113,938 | Gill | Apr. 12, 1938 |
| 2,257,489 | Wells | Sept. 30, 1941 |
| 2,262,018 | Lighton | Nov. 11, 1941 |
| 2,262,059 | Smith | Nov. 11, 1941 |
| 2,296,747 | Stover | Sept. 22, 1942 |

FOREIGN PATENTS

| 22,605 | Great Britain | Dec. 11, 1900 |